United States Patent [19]

Kruppenbach

[11] 4,398,276
[45] Aug. 9, 1983

[54] APPARATUS AND METHOD FOR GEOPHONE SENSOR STRING PLACEMENT

[75] Inventor: John A. Kruppenbach, Lancaster, Tex.

[73] Assignee: Energy Analysts Incorporated, Dallas, Tex.

[21] Appl. No.: 190,640

[22] Filed: Sep. 24, 1980

[51] Int. Cl.³ .............................................. G01V 1/18
[52] U.S. Cl. .................................. 367/191; 405/154; 367/177
[58] Field of Search .................... 367/14, 15, 20, 177, 367/16, 178; 181/110, 111; 405/154, 157

[56] References Cited

U.S. PATENT DOCUMENTS 3,930,219 12/1975 Kostelnicek ........................ 367/177

Primary Examiner—Maynard R. Wilbur
Assistant Examiner—Marian R. Gordon
Attorney, Agent, or Firm—Richards, Harris & Medlock

[57] ABSTRACT

A method and apparatus for gathering a geophone sensor string (10) is provided. The geophone sensor string (10) comprises individual sensors (12) for sensing motion of the earth, an interconnecting cable (14) and ring members (22). A line (30) is secured to a ring member (22) at one end of the geophone sensor string. The line is passed through the remaining ring members on the geophone sensor string and extends through the ring member adjacent the opposite end of the geophone sensor string. Drawing the line (30) in the direction of the arrow (32) lifts the sensors off the ground and gathers the sensors and interconnecting cable in an untangled and compact form for storage. The technique of the present invention is adapted for use with vehicles to eliminate manual labor.

5 Claims, 2 Drawing Figures

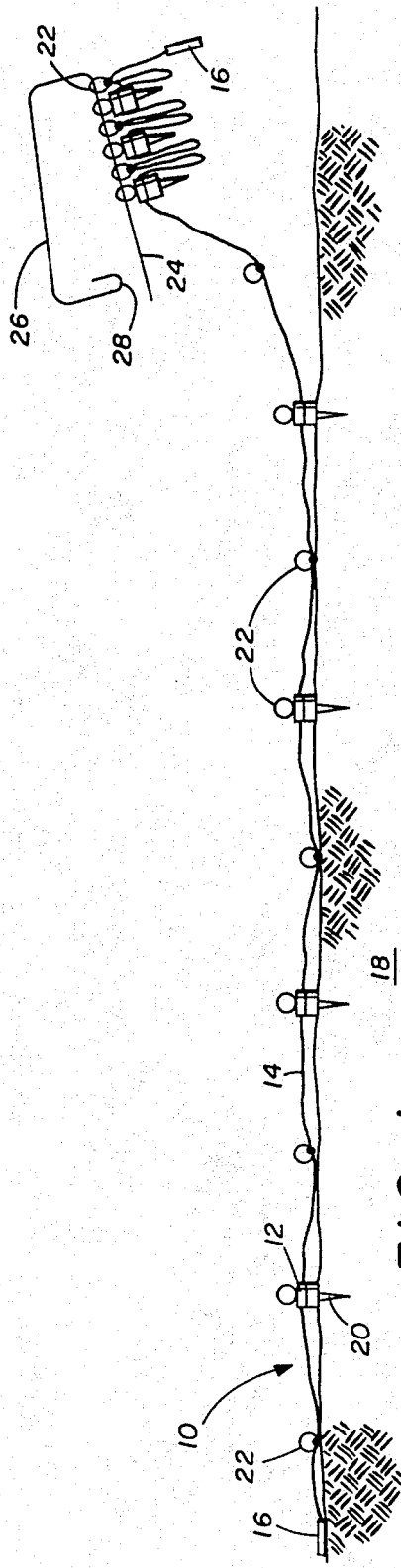
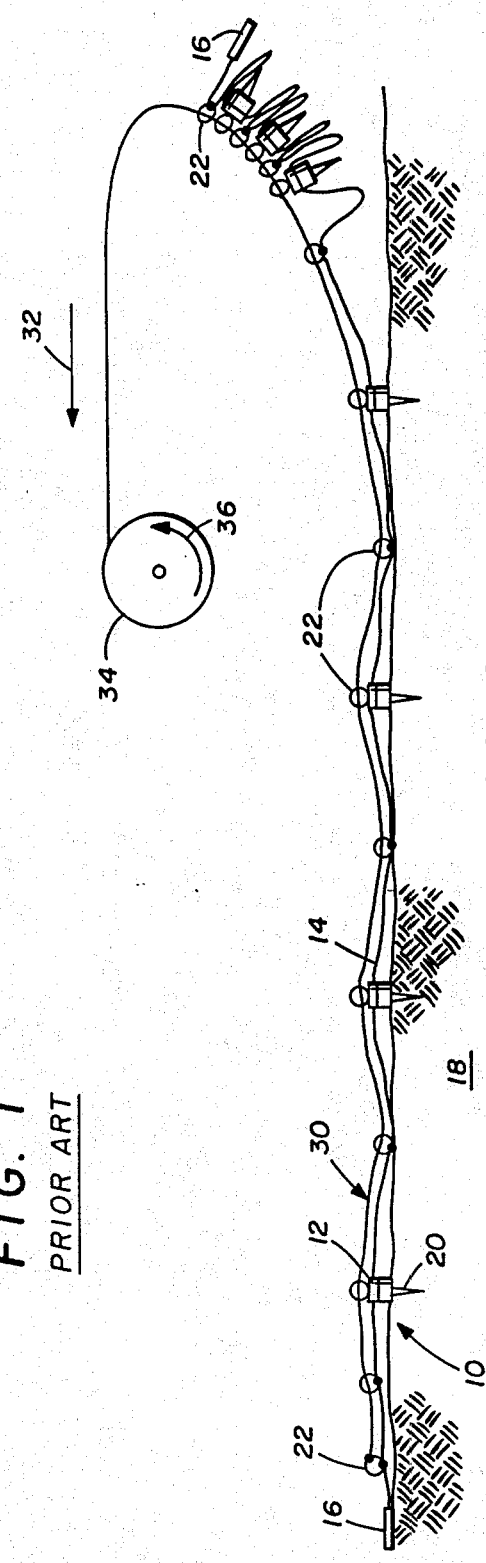

APPARATUS AND METHOD FOR GEOPHONE SENSOR STRING PLACEMENT

TECHNICAL FIELD

This invention relates to the art of sensing seismic events by use of a string of sensors, and more particularly to a device and method for simplifying the placement and recovery of a geophone sensor string.

BACKGROUND ART

The use of geophone sensors to sense seismic events has been common since at least 1930. Typically, individual geophone sensors will be placed along an interconnecting signal cable for transmitting the signals generated by the sensors to form a geophone sensor string. Each sensor is usually provided with a device to secure the sensor in the ground, such as a spike.

Geophone sensor strings of the prior art must be positioned and retrieved by time-consuming and laborious manual steps. A geophone sensor string is typically stored on a hanger device from which the individual sensors are hung by additional manual labor. They may also be coiled or placed in bags or boxes for storage. A large and steadily growing part of the total cost of seismographic exploration is for the labor to put in place and retrieve the sensors and interconnecting cable.

DISCLOSURE OF THE INVENTION

In accordance with the present invention, a method of collecting and storing a geophone sensor string comprising a plurality of sensors spaced predetermined distances apart on a surface is provided, utilizing a cable interconnecting said geophone sensors and a plurality of ring members for hanging said string for storage. The method comprises the step of securing a line to a ring member adjacent one end of the geophone sensor string and passing said line through selected ring members to extend from a ring member adjacent the opposite end of said sensor string. The method further includes the step of drawing the line so that the geophone sensor string is gathered for storage.

In accordance with another aspect of the present invention, an improved method of collecting a geophone sensor string of the type wherein individual geophone sensors are placed at a predetermined distance along a cable for placement on the ground to sense seismic events, each sensor having a ring secured thereto, is provided. The improved method includes the steps of securing a line to a ring adjacent one end of the geophone sensor string and passing the line through selected rings along the length of the geophone sensor string and through a ring adjacent the opposite end of the geophone sensor string. The improved method further comprises the step of drawing the line to lift the sensors off the ground and collapse the sensor string for storage.

In accordance with yet another aspect of the present invention, an apparatus is provided for use in seismic research. The apparatus comprises a plurality of sensors adapted for placement at spaced apart positions on a surface and a cable interconnecting said sensors and transmitting signals from the sensors. The apparatus further comprises a plurality of ring members, each ring member being secured to a sensor and a line secured to a ring member adjacent a first end of the cable and passing through the remaining ring members. The apparatus further includes means to draw the line to remove the sensors from the surface and gather the sensors and interconnecting cable for storage.

In accordance with yet another aspect of the present invention, an improved apparatus for use in seismic research including a geophone sensor string of the type in which individual sensors are positioned at predetermined locations along a cable, the sensor string having a plurality of members distributed therealong adapted to hang the sensor string, is provided. The improvement comprises a line secured at one end of the sensor string and passing through the members. The improvement further comprises means to draw the line to remove the sensors from the ground and position the sensors adjacent each other for storage.

A method of collecting and storing a seismic cable for use with a geophone sensor string is provided. The method comprises the steps of mounting ring members along the length of the seismic cable and securing a line to a ring member adjacent one end of the seismic cable. The method further comprises the steps of passing the line through selected ring members to extend from a ring member adjacent the opposite end of the seismic cable and drawing the line so that the seismic cable is gathered for storage.

BRIEF DESCRIPTION OF THE DRAWINGS

A more complete understanding of the invention may be had by reference to the following Detailed Description when taken in conjunction with the accompanying Drawings, wherein:

FIG. 1 is a view of a geophone sensor string illustrating the prior art technique of manually removing the sensors from the ground and placing them on a hanger for storage; and FIG. 2 illustrates a geophone sensor string employing the present invention with a portion of the geophone sensor string gathered for storage.

DETAILED DESCRIPTION

Referring now to the Drawings, wherein like reference characters designate like or corresponding parts throughout several views, FIGS. 1 and 2 illustrate a geophone sensor string 10 with which the present invention is employed.

Each geophone sensor string 10 includes a number of sensors 12 which detect movement in the ground on which the sensor is placed. Sensors of this type are well known in the art and may variously be referred to as seismometers, phones, geophones or jugs. An interconnecting cable 14 runs between a number of the sensors 12 and contains means to transmit the signal induced in a sensor 12 by motion in the ground to the first cable in a series of seismic cables (not shown). The seismic cables in turn transmit the signal to a central analyzing apparatus (not shown). Typically, four to twenty four sensors 12 are provided in each geophone sensor string 10 and are separated by any distance desired, usually ten to forty feet. Connectors 16 are provided at each end of the geophone sensor string 10 for connection to another sensor string or to a seismic cable running to a central location. Each seismic cable is identical to interconnecting cable 14 without sensors 12 positioned therealong. A seismic cable is usually in sections 200 to 500 feet long and several may be connected together to form a length of 2 to 5 miles between a sensor string 10 and a central location. Each sensor 12 may be provided with a means for securing the sensor in the ground 18, such as spikes 20.

Many sensors are constructed with rings or ring members 22 pivotally secured thereto to hang the sensor from a hanger after use. Such a sensor is constructed by Mark Products, Inc. of Houston, Texas. Ring members 22 may also be positioned on the cable 14 itself between the sensors or at the ends of the cable. Hooks, clips or any other similar structure could be substituted for ring members 22.

In the known method of collecting and storing a geophone sensor string 10 as illustrated in FIG. 1, the individual sensors must be manually picked up from the ground. Each ring member, secured either to a sensor or to the cable, is sequentially slid over arm 24 of a hanger 26. The hanger 26 may have a hook 28 for receiving the end of arm 24 after the entire geophone sensor string 10 has been hung therefrom. It can be readily understood that a great deal of manual labor is involved in this technique. The known method of collecting and storing seismic cable includes the technique of looping the seismic cable about the shoulders of an individual or rolling the seismic cable onto a reel. The reel may be carried by an individual on his chest or back, or mounted on a vehicle.

In the present invention, a line 30 is secured at one end to a ring member 22 adjacent the end of the geophone sensor string 10 as shown in FIG. 2. The line is then threaded or passed through the ring members 22 along the geophone sensor string 10 to extend from the ring member 22 adjacent the opposite end of the geophone sensor string 10. Line 30 may be formed of wire, rope, cord or any other suitable material.

To remove the sensors 12 from the ground 18 and gather the sensors and interconnecting cable 14 for storage, all that is necessary is to draw line 30 in the direction of arrow 32. This motion will cause the sensors 12 to be lifted off the ground, beginning with the sensors at the end of the geophone sensor string 10 opposite that to which line 30 is secured. As the line 30 is drawn further in the direction of arrow 32, gravity will tend to gather the sensors 12 together and fold the interconnecting cable 14 to form a compact package for storage as shown in the right side of FIG. 2. However, means such as a barrier or stop may also be provided for preventing the motion of any part of a geophone sensor string 10 beyond a predetermined point in the direction of arrow 32 so that the drawing of line 30 will cause the entire geophone sensor string to collapse into a compact package for storage against the stop. Alternatively, line 30 may be drawn in a direction to collapse the geophone sensor string 10 from the end to which the line is secured. While line 30 may be drawn by manual labor, the technique of the present invention will permit various kinds of vehicles to remove and gather the geophone sensor string 10. A cable drum 34 is illustrated in FIG. 2. The cable drum may be mounted on a vehicle such as truck and may be rotated to draw the line 30 in the direction of arrow 32.

It is also possible to position ring members 22 along a seismic cable used with sensor string 10. A line 30 may then be passed through ring members 22 and secured at one end to a ring member 22 adjacent an end of the seismic cable. The seismic cable may then be gathered for storage in a manner similar to that recited above with respect to sensor string 10.

Therefore, it can be seen that the technique of the present invention permits the sensors and interconnecting cable of a geophone sensor string 10 to be removed from the ground and gathered without causing a tangle, in less time, and can be done by or from a vehicle. The technique also permits a rapid deployment of the geophone sensor string 10 by releasing the line 30 so that the sensor string may be extended to its full length. The technique of the present invention further permits the efficient gathering and deployment of seismic cable.

Although only a single embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. A method of collecting and storing a geophone sensor string comprising a plurality of sensors spaced predetermined distances apart on a surface, a cable interconnecting said sensors and a plurality of ring members for hanging said string for storage, comprising the steps of:

securing a line to a ring member adjacent one end of the geophone sensor string and passing said line through selected ring members for substantially unrestrained motion through said ring members, said line extending from a ring member adjacent the opposite end of the geophone sensor string; and drawing said line to fold said interconnecting cable so that the geophone sensor string is gathered for storage.

2. In a method of collecting a geophone sensor string, of the type wherein individual sensors are spaced at a predetermined distance along a cable for placement on the ground to sense seismic events, each sensor having a ring secured thereto, the improvement comprising the steps of:

securing a line to a ring adjacent one end of the geophone sensor string;

passing the line through selected rings along the length of the geophone sensor string and through a ring adjacent the opposite end of the geophone sensor string, the line being substantially unrestricted in its motion through said selected ring; and drawing the line and lifting the sensors off the ground to fold the cable and collapse the geophone sensor string for storage.

3. An apparatus for use in seismic research comprising:

a plurality of sensors adapted for placement at spaced apart positions on a surface;

a cable for interconnecting said sensors and transmitting signals from said sensors;

a plurality of ring members, each ring member being secured to a sensor;

a line secured to a ring member adjacent a first end of the cable and passing through the remaining ring members, said line being substantially unrestricted in its motion through said remaining ring members; and means to draw said line to remove the sensors from the surface, gather the sensors and fold the interconnecting cable for storage.

4. An improved apparatus for use in seismic research including a geophone sensor string of the type in which individual sensors are positioned at predetermined locations along a cable for placement on the ground, the sensor string having a plurality of members distributed therealong adapted to hang the sensor string, wherein the improvement comprises:

a line secured at one end of the sensor string and passing through said members for substantially free movement therethrough; and means to draw said line to remove the sensors from the ground, fold the cable and position the sensors adjacent each other for storage.

5. A method of collecting and storing a seismic cable for use with a geophone sensor string comprising the steps of:

mounting ring members along the length of the seismic cable;

securing a line to a ring member adjacent one end of the seismic cable and passing said line through selected ring members to extend from a ring member adjacent the opposite end of the seismic cable, said line having substantially unrestricted motion through said selected ring members;

drawing said line through said selected ring members; and resisting movement of said seismic cable in the direction the line is drawn so that the seismic cable is gathered for storage.

* * * * *